United States Patent
Szczepanik et al.

(10) Patent No.: US 11,947,436 B2
(45) Date of Patent: Apr. 2, 2024

(54) AUTOMATIC EVALUATION OF VIRTUAL MACHINE COMPUTING POWER

(71) Applicant: International Business Machines Corporation, Armonk, NY (US)

(72) Inventors: Grzegorz Piotr Szczepanik, Cracow (PL); Piotr Kalandyk, Zielonki (PL); Pawel Tadeusz Januszek, Cracow (PL); Lukasz Jakub Palus, Cracow (PL); Hubert Kompanowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 17/128,423

(22) Filed: Dec. 21, 2020

(65) Prior Publication Data
US 2022/0197767 A1     Jun. 23, 2022

(51) Int. Cl.
G06F 11/30    (2006.01)
G06F 9/455    (2018.01)
G06F 11/07    (2006.01)
G06F 11/32    (2006.01)

(52) U.S. Cl.
CPC ........ *G06F 11/301* (2013.01); *G06F 9/45558* (2013.01); *G06F 11/076* (2013.01); *G06F 11/327* (2013.01); *G06F 2009/45562* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,310,864 B1 | 4/2016 | Klein | |
| 9,575,539 B2 | 2/2017 | Kansal et al. | |
| 10,409,642 B1* | 9/2019 | Tang | G06F 9/5005 |
| 10,992,542 B2* | 4/2021 | Sherwood | H04L 41/14 |
| 2011/0072431 A1 | 3/2011 | Cable et al. | |

(Continued)

FOREIGN PATENT DOCUMENTS

| | | |
|---|---|---|
| CN | 103873498 B | 6/2017 |
| WO | 2009058042 A1 | 5/2009 |

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Lewis A Bullock, Jr.
*Assistant Examiner* — Melissa A Headly
(74) *Attorney, Agent, or Firm* — Richard B. Thomas

(57) ABSTRACT

A set of virtual machines is deployed on a hypervisor. At each virtual machine, one or more local scans is performed to generate a set of computing resource consumption data. In response to receiving a set of hypervisor resource consumption data, a stability factor is generated. Based on the set of resource consumption data, the set of hypervisor resource consumption data, and the stability factor, a determination is made that a default consumption metric exceeds a threshold. In response to the determination, a custom consumption metric is generated, based on at least the set of computing resource consumption data. A user is notified of the custom consumption metric.

12 Claims, 5 Drawing Sheets

(56) References Cited

U.S. PATENT DOCUMENTS

| | | |
|---|---|---|
| 2013/0073731 A1 | 3/2013 | Bose et al. |
| 2013/0097601 A1 | 4/2013 | Podvratnik et al. |
| 2016/0147550 A1* | 5/2016 | McWilliams ....... G06F 9/45558 718/1 |
| 2018/0165111 A1 | 6/2018 | Feng |
| 2018/0203738 A1 | 7/2018 | Banerjee |

OTHER PUBLICATIONS

Application No. GB2117424.8. Combined Search and Examination Report under Sections 17 and 18(3). dated Jul. 4, 2022. 10 pages.
UK Patent Application No. 2117424.8 Reply filed Oct. 16, 2023.
UK Patent Application No. 2117424.8 Reply filed Feb. 16, 2023.

* cited by examiner

AUTOMATIC EVALUATION OF VIRTUAL MACHINE COMPUTING POWER

BACKGROUND

The present disclosure relates generally to the field of computing resource consumption, and more particularly to estimating the consumption of computing resources.

Virtual machines and hypervisors are commonly employed in cloud computing environments. Monitoring the consumption of computing resources allows a cloud service provider to gauge efficiency, and it allows a consumer to judge whether to scale up/down his/her cloud operations.

SUMMARY

Embodiments of the present disclosure include a method, computer program product, and system for estimating the consumption of computing resources.

A set of virtual machines is deployed on a hypervisor. At each virtual machine, one or more local scans is performed to generate a set of computing resource consumption data. In response to receiving a set of hypervisor resource consumption data, a stability factor is generated. Based on the set of resource consumption data, the set of hypervisor resource consumption data, and the stability factor, a determination is made that a default consumption metric exceeds a threshold. In response to the determination, a custom consumption metric is generated, based on at least the set of computing resource consumption data. A user is notified of the custom consumption metric.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
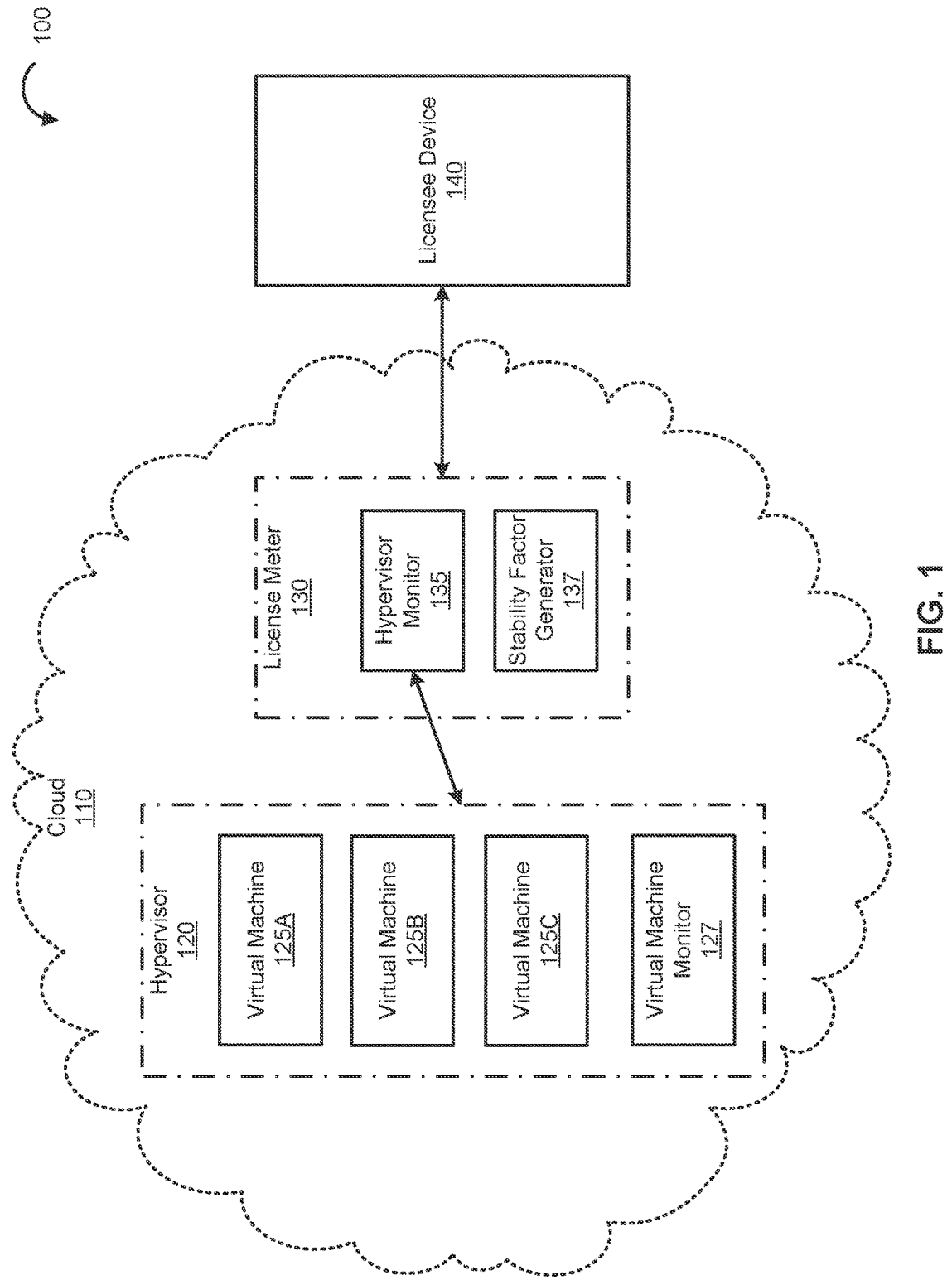
FIG. 1 illustrates an example network environment for estimating computing resource consumption, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing resource consumption, and more particularly to estimating the consumption of computing resources. While the present disclosure is not necessarily limited to such applications, various aspects of the disclosure may be appreciated through a discussion of various examples using this context.

Virtual machines and hypervisors are commonly employed in cloud computing environments. Monitoring the consumption of computing resources allows a cloud service provider to gauge efficiency, and it allows a consumer to judge whether to scale up/down his/her cloud operations.

When licensing cloud computing resources to consumers, enterprises commonly use data collected from the hypervisors upon which the virtual machines are deployed, typically using Application Programming Interfaces (APIs). The data collected in this way may be aggregated with data collected from scans of the individual virtual machines. These aggregated data may include, for example, metrics regarding the use of processors, graphical processing units (GPUs), memory caches, network bandwidth, electricity consumption, number of computations performed, the amount of time an application was run, a priority of a particular application and/or virtual machine, encryption use, encryption type, storage space availability and consumption, etc.

However, when a virtual machine is first deployed, there may be little, if any, of such data, and any data that does exist may be irregular and unrepresentative of normal operating metrics. For example, computing resource consumption may be greatly increased while applications are installed and tested. Alternatively, network bandwidth may be greatly reduced before an application is made available for public use. In such scenarios, it may be difficult to determine an appropriate licensing fee for the use of the cloud computing resources involved with a particular hypervisor or virtual machine. In some instances, a default calculation may be used, based on expected/estimated usage, to determine consumption and, consequently, a licensing fee. This may lead to a consumer being over- or under-billed.

Obtaining a more accurate estimation of the computing resources consumed typically requires coordination among teams of professionals, including: 1) the team responsible for deploying the virtual machine(s), 2) the team administrating a license metric tool (e.g., IBM LICENSE METRIC TOOL), and 3) the team managing the virtual hosting environment (e.g., VMWARE). The first team is often directed by a consuming entity, while the second and third may, or may not, be part of the same entity. In some situations, coordinating three teams across three separate entities may consume a significant number of work hours and time.

Embodiments of the present disclosure contemplate collecting data from hypervisors as soon as a connection to a client/consumer is made functional (e.g., hypervisor resource consumption data), combining that data with information gleaned from local scans of the virtual machine(s) (e.g., computing resource consumption data), and adding a stability factor (e.g., a metric reflecting both historical license capacity consumption and real-time consumption data from the full infrastructure). Default consumption values (e.g., a default consumption metric), which may be higher than those expected by a consumer, may be corrected, if needed, and reported to a licensing administrator, consumer, etc. to generate a more accurate reflection of the overall consumption of the licensed resources.

In some embodiments, the data collected from the local scans of the virtual machine(s) may be collected by a monitor and/or stored in a database. This local scan data may, in embodiments, be matched to data retrieved from the hypervisor. However, in some embodiments, this matching may be inaccurate or unavailable—in such cases, default values may be used for a consumption report, and the data may be flagged. Once enough data is collected to perform the match, a consumption calculation may be repeated using the more accurate information, and the consumption report may be updated.

As an example, assume that local scans of a set of virtual machines were performed on day one, but the data from the hypervisor was not obtained or was otherwise unavailable. In such a circumstance, a default consumption metric may be introduced to estimate the overall consumption. Delays in obtaining hypervisor resource consumption data may include firewall misconfigurations, data processing schedules, errors, manual intervention idiosyncrasies, etc.

Further assume that, on day three, the hypervisor resource consumption data is obtained. At this point, the estimation of the overall consumption may be reexamined. The local scans of the virtual machine(s) may be used to determine whether there was a change or unexpected variance in the local environment.

Along with the local scans, the hypervisor resource consumption data may, in embodiments, be used to determine a stability factor for the environment. At this point, it may be determined whether the actual overall consumption is in-line with expectations/estimations, as well as whether the stability of the environment was relatively consistent (e.g., nominal overall consumption, but with periods of high traffic/consumption may be treated differently from nominal overall consumption with consistent traffic/consumption).

In some embodiments, if either, or both, the overall consumption and/or the stability factor indicate that the default consumption metric falls outside an acceptable range, a custom consumption metric may be generated, based on the actual overall consumption and stability factor. In such embodiments, the administrator and/or consumer may be notified of the correction, and the justifications as to why the custom consumption metric was used.

Embodiments of the present disclosure may provide a way for both a cloud software vendor and a consumer to protect themselves against unexpected/undesired peaks and valleys at the beginning of a license monitoring cycle. In this way, poor cost/benefit scenarios for both the vendor and the consumer may be avoided, further leading to decreased submission of support tickets and negative customer service reports.

Referring now to FIG. 1, illustrated is an example network environment 100 for estimating computing resource consumption, in accordance with embodiments of the present disclosure. Example network environment 100 may include, for example, a licensee device 140, cloud 110, hypervisor 120, and license meter 130. In some embodiments, certain functions of a licensee device 140, hypervisor 120, and license meter 130 may be implemented at a location different from the depiction.

According to embodiments, the licensee device 140, cloud 110, hypervisor 120, and license meter 130 may be comprised of computer systems (e.g., may contain the same or similar components as computer system 501). The licensee device 140, cloud 110, hypervisor 120, and license meter 130 may be configured to communicate with each other through an internal or external network interface (not shown). The network interfaces may be, e.g., modems, wireless network adapters, Ethernet adapters, etc. The licensee device 140, cloud 110, hypervisor 120, and license meter 130 may be further equipped with displays or monitors (not shown). Additionally, licensee device 140, cloud 110, hypervisor 120, and license meter 130 may include optional input devices (e.g., a keyboard, mouse, scanner, or other input device), and/or any commercially available or custom software (e.g., image processing software, object identification software, etc.). In some embodiments, licensee device 140, cloud 110, hypervisor 120, and license meter 130 may include additional servers, desktops, laptops, IoT (Internet of Things) devices, or hand-held devices.

Licensee device 140, cloud 110, hypervisor 120, and license meter 130 may further include additional storage (e.g., storage interface 514). The storage may include, for example, virtualized disk drives, physical hard disk drives, solid state storage drives, or any other suitable storage media. In some embodiments, workload data and metadata may be stored, temporarily or permanently.

The licensee device 140, cloud 110, hypervisor 120, and license meter 130 may be distant from each other and may communicate over a network (not shown). In embodiments, the cloud 110 may be a central hub from which licensee device 140, hypervisor 120, and license meter 130 can establish a communication connection, such as in a client-server networking model. In other embodiments, license meter 130 may act as such a hub for the hypervisor 120 and licensee device 140. In some embodiments, the licensee device 140, cloud 110, hypervisor 120, and license meter 130 may be configured in any other suitable network relationship (e.g., in a peer-to-peer configuration or using another network topology).

In embodiments, the connections among the components of networking environment 100 can be implemented using any number of any suitable communications media. For example, a wide area network (WAN), a local area network (LAN), the Internet, or an intranet. In certain embodiments, the licensee device 140, cloud 110, hypervisor 120, and license meter 130 may be local to each other and communicate via any appropriate local communication medium. For example, the licensee device 140, cloud 110, hypervisor 120, and license meter 130 may communicate using a local area network (LAN), one or more hardwire connections, a wireless link or router, or an intranet. In some embodiments, licensee device 140, cloud 110, hypervisor 120, and license meter 130, and any other devices, may be communicatively coupled using a combination of one or more networks and/or one or more local connections.

In some embodiments, the network environment 100 can be implemented within, or as a part of, a cloud computing environment, as depicted. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over a network. Further detail regarding cloud computing is given with respect to FIGS. 3 & 4.

According to embodiments, licensee device 140 may include, for example, an enterprise server, client device, or any other suitable device from which a consumer or other user may interact with license meter 130, and from which such a consumer/user may deploy virtual machines, such as virtual machines 125A-C.

Cloud 110 may include, for example, hypervisor 120 and license meter 130. Hypervisor 120 may include a layer of hardware resources/components, upon which a virtual machine (e.g., virtual machines 125A-C) may be established. Hypervisor 120 may be a type 1 or a type 2 hypervisor, according to embodiments.

Hypervisor 120 may include, in some embodiments, virtual machines 125A-C and virtual machine monitor 127. Virtual machines 125A-C may be deployed by the owner of licensee device 140, for example. Virtual machines 125A-C may be custom designed to serve a specific purpose, or they may be generalized to serve multiple purposes. In some embodiments, virtual machines 125A-C may represent any number of virtual machines.

Virtual machine monitor 127 may, according to embodiments, perform local scans of the virtual machines 125A-C to generate computing resource consumption data, as described herein. In some embodiments, virtual machine monitor 127 may further monitor hypervisor 120 to generate, or contribute to, hypervisor resource consumption data.

Local scans of virtual machines 125A-C may include determining the amount of processor resources used, memory resources used, network traffic bandwidth used, in-memory calculations performed, any hardware devices underlying the hypervisor that may be dedicated to a particular virtual machine, etc.

License meter 130 may include a hypervisor monitor 135 and a stability factor generator 137. Hypervisor monitor 135 may retrieve/receive hypervisor resource consumption data, as described herein, from hypervisor 120.

Stability factor generator 137 may generate, based on historical and real-time hypervisor resource consumption data, a stability factor. In some embodiments, the stability factor generator may further consider some amount of the computing resource consumption data from one or more of virtual machines 125A-C. In some embodiments, stability factor generator 137 may further consider the general stability of cloud 110 outside of hypervisor 120 and license meter 130, both historically and in real-time.

In some embodiments, license meter 130 may employ a default consumption metric when determining overall computing resource consumption, or it may generate, as discussed herein, a custom consumption metric, when appropriate. In some embodiments, license meter 130 may be employed as a gateway between hypervisor 120 and licensee device 140. In other embodiments, license meter 130 may be incorporated directly onto licensee device 140, for example as a condition for the use of hypervisor 120 and/or the establishment of virtual machines 125A-C.

It is noted that FIG. 1 is intended to depict the representative major components of an example network environment 100. In some embodiments, however, individual components may have greater or lesser complexity than as represented in FIG. 1; components other than, or in addition to, those shown in FIG. 1 may be present, and the number, type, and configuration of such components may vary.

Figure 2:
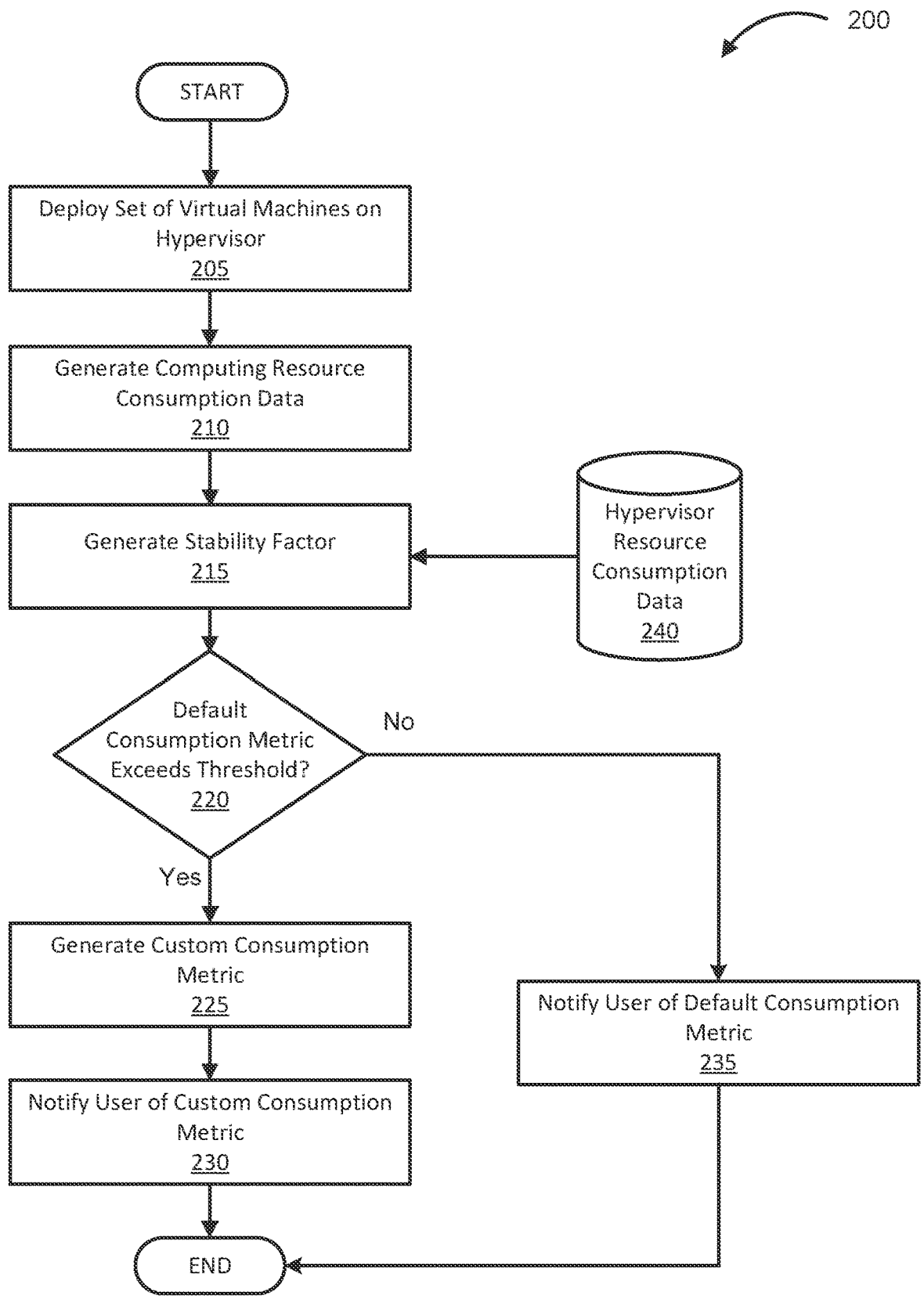
FIG. 2 illustrates an example method for estimating computing resource consumption, in accordance with embodiments of the present disclosure.

Referring now to FIG. 2, illustrated is an example method 200 for estimating computing resource consumption, in accordance with embodiments of the present disclosure. Example method 200 may begin at 205, where a set of virtual machines is deployed on a hypervisor (e.g., hypervisor 120), as discussed herein.

At 210, computing resource consumption data is generated. For example, virtual machine monitor 127 may perform local scans of the deployed virtual machines (e.g., virtual machines 125A-C) to determine the amount and type of computing resources consumed.

At 215, a stability factor is generated. The stability factor may take into account the computing resource consumption data generated at 210, as well as hypervisor resource consumption data 240. Components of computing resource consumption data and/or hypervisor resource consumption data may be weighted in the generation of the stability factor. For example, in embodiments where in-memory calculations are possible, memory consumption metrics may be weighted, as the in-memory calculations may decrease traditional processor consumption. The stability factor may, in some embodiments, further reflect the amount of upscaling and downscaling performed for a particular virtual machine or group of virtual machines.

As described herein, hypervisor resource consumption data and computing resource consumption data may include both historical and real-time data. In some embodiments, real-time data may be weighted compared to historical data. According to embodiments, the historical computing resource consumption data and the historical hypervisor resource consumption data may reflect average values, respectively. The average values may be taken for the lifetime of their respective virtual machine(s) and/or hypervisor, or they may be taken for a particular timeframe (e.g., a period of time where historical averages appear similar to current, real-time values).

At 220, it is determined whether a default consumption metric exceeds a threshold. In some embodiments, the default consumption metric may be indicative of the overall consumption expected from the historical computing resource consumption data and the historical hypervisor resource consumption data. The threshold may, according to embodiments, include a ratio of the stability factor compared to the default consumption metric, for example.

If, at 220, it is determined that the default consumption metric did not exceed the threshold, it may be assumed, for example, that the default consumption metric is reflective of the overall consumption, and a user/administrator may be notified of the default consumption metric at 235. The notification may include, for example, a license consumption report.

If, however, at 220, it is determined that the default consumption metric exceeds the threshold, then a custom consumption metric may be generated at 225, as described herein. The custom consumption metric 225 may, in some embodiments, more heavily weigh the real-time consumption data gathered from the virtual machine(s) and/or hypervisor, for example. In some embodiments, the custom consumption metric may be reflective of the average overall resource consumption for a historical set of stabilized computing resource consumption data (e.g., a consumption metric reflecting similar virtual machines for which custom consumption metrics were generated)

At 230, the user and/or administrator may be notified of the custom consumption metric. In some embodiments, this may include, for example, a license consumption report and may, or may not, reference the default consumption metric and a justification for using the custom consumption metric.

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
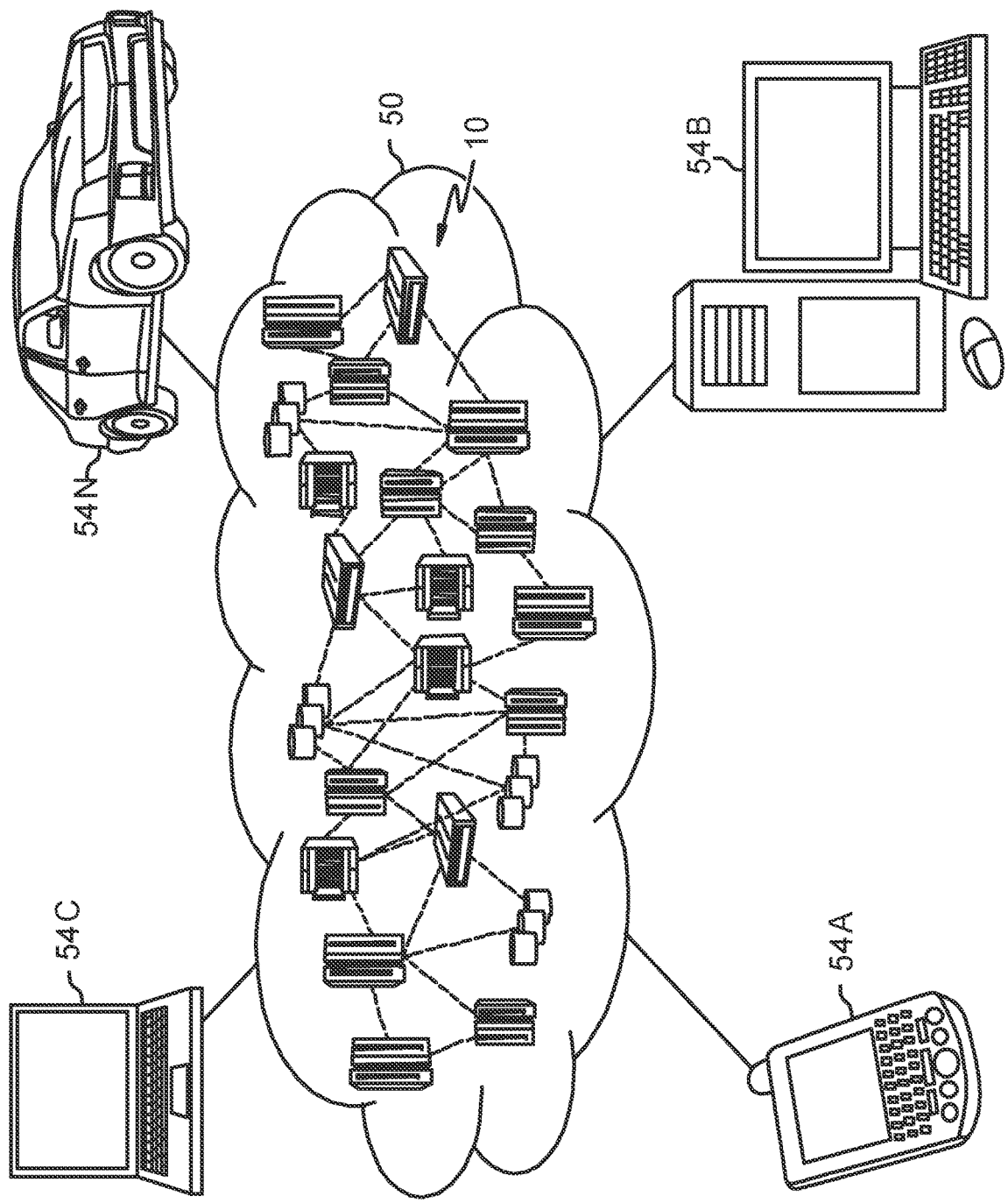
FIG. 3 depicts a cloud computing environment according to an embodiment of the present disclosure.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 4:
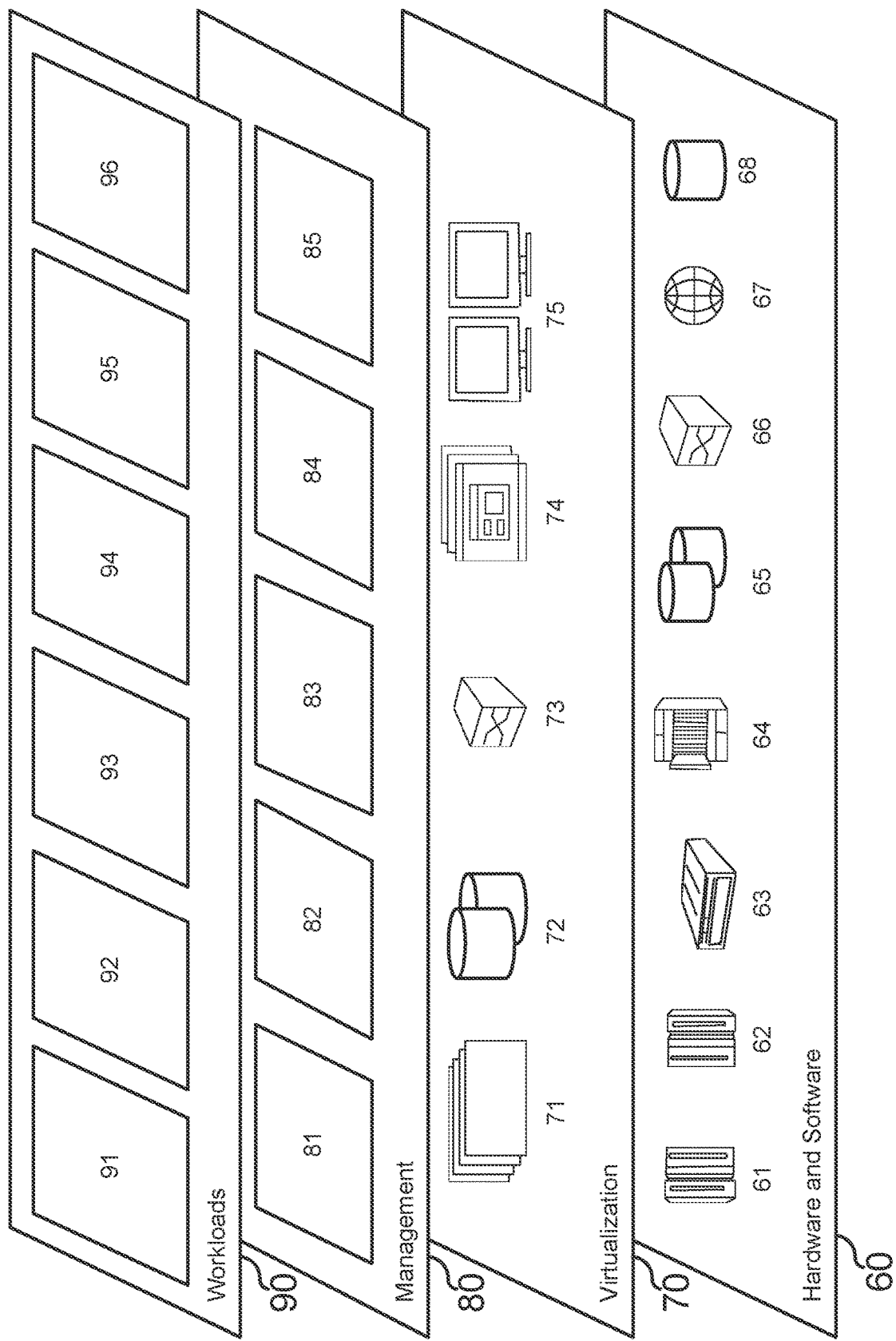
FIG. 4 depicts abstraction model layers according to an embodiment of the present disclosure.

Referring now to FIG. 4, a set of functional abstraction layers provided by cloud computing environment 50 (FIG. 3) is shown. It should be understood in advance that the components, layers, and functions shown in FIG. 4 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating computing resource consumption 96.

Figure 5:
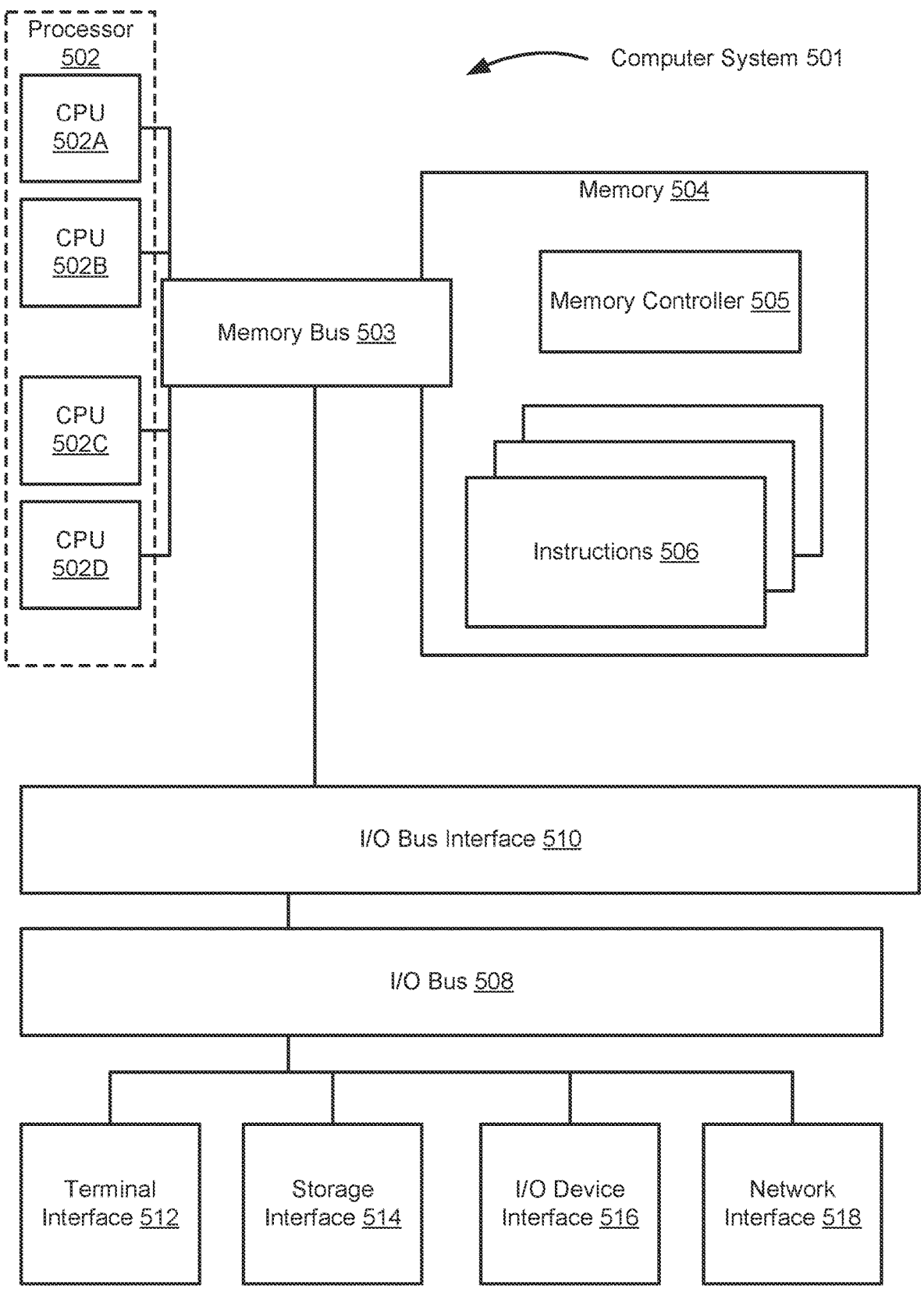
FIG. 5 depicts a high-level block diagram of an example computer system that may be used in implementing embodiments of the present disclosure.

Referring now to FIG. 5, shown is a high-level block diagram of an example computer system 501 that may be configured to perform various aspects of the present disclosure, including, for example, method 200, described in FIG. 2. The example computer system 501 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 501 comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache. Memory subsystem 504 may include instructions 506 which, when executed by processor 502, cause processor 502 to perform some or all of the functionality described above with respect to FIG. 2.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501 and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative example components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for estimating consumption of computing resources, comprising:

executing a monitoring cycle, wherein executing the monitoring cycle comprises:
performing, at each virtual machine of a set of virtual machines, one or more local scans to generate a first set of computing resource consumption data, wherein the first set of computing resource consumption data comprises respective computing resource consumption data from each virtual machine;
receiving the first set of computing resource consumption data;
receiving, from a hypervisor, a first set of hypervisor resource consumption data;
in response to receiving the first set of computing resource consumption data and the first set of hypervisor consumption data:
summing the first set of computing resource consumption data plus the first set of hypervisor resource consumption data, thereby generating overall consumption data; and generating a stability factor, wherein the stability factor is a metric at least partially reflecting:

actual overall consumption data based on the first set of computing resource consumption data and the first set of hypervisor consumption data; and nominal overall consumption data based on historical computing resource consumption data and historical hypervisor resource consumption data, wherein the nominal overall consumption data at least partially relates to expectations of the overall consumption data, wherein the stability factor at least partially indicates a consistency of the overall consumption data through a relationship between the actual overall consumption data and the expectations of the overall consumption data based on the nominal overall consumption data;

determining, based on the first set of computing resource consumption data, the first set of hypervisor resource consumption data, and one or more of the overall consumption and the stability factor, whether a default consumption metric exceeds a threshold, wherein the default consumption metric estimates the overall consumption data, and the threshold is at least partially representative of a ratio of the stability factor compared to the default consumption metric;

in response to a determination that the default consumption metric does not exceed the threshold:

notifying a user of the default consumption metric; and updating the historical computing resource consumption to include the actual overall consumption data; and in response to a determination that the default consumption metric does exceed the threshold:

generating, based on the actual overall consumption data and the stability factor, a custom consumption metric that is used in place of the default consumption metric, wherein the custom consumption metric reflects an average overall consumption for a historical set of stabilized computing resource consumption data; and notifying a user of the custom consumption metric; and repeating, at predetermined intervals, executing the monitoring cycle.

2. The method of claim 1, wherein the default consumption metric reflects an average for the historical computing resource consumption data.

3. The method of claim 1, wherein the custom consumption metric further reflects an average for a historical set of consumption data for similar virtual machines to the deployed set of virtual machines for which custom consumption metrics were also generated, thereby defining a stabilized computing resource consumption data.

4. The method of claim 1, wherein one or more of:

the historical computing resource consumption data reflects one or more average values; and the historical hypervisor resource consumption data reflects one or more average values.

5. A computer program product for estimating consumption of computing resources, the computer program product comprising a computer readable storage medium having program instructions embodied therewith, the program instructions executable by a device to cause the device to:

execute a monitoring cycle, wherein such execution of the monitoring cycle comprises:

perform, at each virtual machine of a set of virtual machines, one or more local scans to generate a first set of computing resource consumption data wherein the first set of computing resource consumption data comprises respective computing resource consumption data from each virtual machine;

receive the first set of computing resource consumption data;

receive, from a hypervisor, a first set of hypervisor resource consumption data;

in response to the receipt of the first set of computing resource consumption data and the first set of hypervisor consumption data:

sum the computing resource consumption data and the hypervisor resource consumption data, thereby generating overall consumption data; and generate a stability factor, wherein the stability factor is a metric at least partially reflecting:

actual overall consumption data based on the first set of computing resource consumption data and the first set of hypervisor consumption data; and nominal overall consumption data based on historical computing resource consumption data and historical hypervisor resource consumption data, wherein the nominal overall consumption data at least partially relates to expectations of the overall consumption data, wherein the stability factor at least partially indicates a consistency of the overall consumption data through a relationship between the actual overall consumption data and the expectations of the overall consumption data based on the nominal overall consumption data;

determine, based on the first set of computing resource consumption data, the first set of hypervisor resource consumption data, and one or more of the overall consumption data and the stability factor, whether a default consumption metric exceeds a threshold, wherein the default consumption metric estimates the overall consumption data, and the threshold is at least partially representative of a ratio of the stability factor compared to the default consumption metric;

in response to a determination that the default consumption metric does not exceed the threshold:

notify a user of the default consumption metric; and update the historical computing resource consumption to include the actual overall consumption data;

in response to a determination that the default consumption metric does exceed the threshold:

generate, based on the actual overall consumption data and the stability factor, a custom consumption metric that is used in place of the default consumption metric, wherein the custom consumption metric reflects an average overall consumption for a historical set of stabilized computing resource consumption data; and notify a user of the custom consumption metric; and repeat, at predetermined intervals, executing the monitoring cycle.

6. The computer program product of claim 5, wherein the default consumption metric reflects an average for the historical computing resource consumption data.

7. The computer program product of claim 5, wherein the custom consumption metric further reflects an average for a historical set of consumption data for similar virtual machines to the deployed set of virtual machines for which custom consumption metrics were also generated, thereby defining a stabilized computing resource consumption data.

8. The computer program product of claim 5, wherein one or more of:
the historical computing resource consumption data reflects one or more average values; and
the historical hypervisor resource consumption data reflects one or more average values.

9. A system for estimating consumption of computing resources, the system comprising:
a memory subsystem, with program instructions included thereon; and
a processor in communication with the memory subsystem, wherein the program instructions cause the processor to:
execute a monitoring cycle, wherein such execution of the monitoring cycle comprises:
perform, at each virtual machine of a set of virtual machines, one or more local scans to generate computing resource consumption data, wherein the first set of computing resource consumption data comprises respective computing resource consumption data from each virtual machine;
receive the first set of computing resource consumption data;
receive, from a hypervisor, a first set of hypervisor resource consumption data; and
in response to the receipt of the first set of computing resource consumption data and the first set of hypervisor consumption data:
sum the computing resource consumption data and the hypervisor resource consumption data, thereby generating overall consumption data;
generate a stability factor, wherein the stability factor is a metric at least partially reflecting:
actual overall consumption data based on the first set of computing resource consumption data and the first set of hypervisor consumption data; and
nominal overall consumption data based on historical computing resource consumption data and historical hypervisor resource consumption data, wherein the nominal overall consumption data at least partially relates to expectations of the overall consumption data, wherein the stability factor at least partially indicates a consistency of the overall consumption data through a relationship between the actual overall consumption data and the expectations of the overall consumption data based on the nominal overall consumption data;
determine, based on the first set of computing resource consumption data, the first set of hypervisor resource consumption data, and one or more of the overall consumption data and the stability factor, whether a default consumption metric exceeds a threshold, wherein the default consumption metric estimates the overall consumption data, and the threshold is at least partially representative of a ratio of the stability factor compared to the default consumption metric;
in response to a determination that the default consumption metric does not exceed the threshold:
notify a user of the default consumption metric; and
update the historical computing resource consumption to include the actual overall consumption data; and
in response to a determination that the default consumption metric does exceed the threshold:
generate, based on the actual overall consumption data, a custom consumption metric that is used in place of the default consumption metric, wherein the custom consumption metric reflects an average overall consumption for a historical set of stabilized computing resource consumption data; and
notify a user of the custom consumption metric; and
repeat, at predetermined intervals, executing the monitoring cycle.

10. The system of claim 9, wherein the default consumption metric reflects an average for the historical computing resource consumption data.

11. The system of claim 9, wherein the custom consumption metric further reflects an average for a historical set of consumption data for similar virtual machines to the deployed set of virtual machines for which custom consumption metrics were also generated, thereby defining a stabilized computing resource consumption data.

12. The system of claim 9, wherein one or more of:
the historical computing resource consumption data reflects one or more average values; and
the historical hypervisor resource consumption data reflects one or more average values.

* * * * *